(12) United States Patent
Bozionek et al.

(10) Patent No.: US 8,656,005 B2
(45) Date of Patent: Feb. 18, 2014

(54) METHOD FOR PROVIDING PERFORMANCE CHARACTERISTICS ON DEMAND

(75) Inventors: Bruno Bozionek, Borchen (DE); Dieter Hemkemeyer, Ölde (DE); Karl Klaghofer, Munich (DE); Ralf Neuhaus, Lünen (DE); Michael Tietsch, Kaufering (DE); Rainer Uecker, Mülhelm (DE); Rainer Zimmermann, Paderborn (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1377 days.

(21) Appl. No.: 10/574,170

(22) PCT Filed: Aug. 5, 2004

(86) PCT No.: PCT/EP2004/051729
§ 371 (c)(1),
(2), (4) Date: Jan. 10, 2007

(87) PCT Pub. No.: WO2005/034463
PCT Pub. Date: Apr. 14, 2005

(65) Prior Publication Data
US 2007/0198627 A1    Aug. 23, 2007

(30) Foreign Application Priority Data
Sep. 29, 2003  (DE) .................................. 103 45 184

(51) Int. Cl.
*G06F 15/173*   (2006.01)
(52) U.S. Cl.
USPC ......................................... 709/224; 709/223

(58) Field of Classification Search
USPC ......... 709/203, 219, 223, 225, 226, 229, 224; 370/230, 231–234
See application file for complete search history.

(56) References Cited

U.S. PATENT DOCUMENTS

| | | | | |
|---|---|---|---|---|
| 4,891,805 | A * | 1/1990 | Fallin | 370/229 |
| 5,568,181 | A * | 10/1996 | Greenwood et al. | 725/92 |
| 6,075,772 | A * | 6/2000 | Brown et al. | 370/235 |
| 6,222,856 | B1 * | 4/2001 | Krishnan et al. | 370/468 |
| 6,411,601 | B1 * | 6/2002 | Shaffer et al. | 370/230 |
| 6,459,681 | B1 * | 10/2002 | Oliva | 370/232 |
| 6,529,499 | B1 * | 3/2003 | Doshi et al. | 370/352 |
| 6,795,445 | B1 * | 9/2004 | Kabie et al. | 370/401 |
| 6,920,110 | B2 * | 7/2005 | Roberts et al. | 370/235 |
| 6,956,857 | B2 * | 10/2005 | Goldman | 370/395.2 |
| 6,968,379 | B2 * | 11/2005 | Nielsen | 709/226 |

(Continued)

FOREIGN PATENT DOCUMENTS

| | | |
|---|---|---|
| EP | 0 996 264 A1 | 4/2000 |
| EP | 1 022 883 A2 | 7/2000 |
| WO | WO 01/61944 A1 | 8/2001 |

*Primary Examiner* — Rupal Dharia
*Assistant Examiner* — Kevin Mai
(74) *Attorney, Agent, or Firm* — Buchanan Ingersoll & Rooney PC

(57) ABSTRACT

Disclosed is a method for transmitting on-demand software and/or data from a server (20) to a terminal (10) in a packet network (50). According to said method, a bandwidth test is performed as a prerequisite for transmission, said test verifying whether the currently available bandwidth is sufficient for transmitting the requested software or data. The server (20) does not transmit the requested software or the requested data if the result of the bandwidth test is negative.

19 Claims, 3 Drawing Sheets

(56) References Cited

U.S. PATENT DOCUMENTS

| | | |
|---|---|---|
| 7,039,712 B2 * | 5/2006 | Valavi et al. .................. 709/228 |
| 2002/0126699 A1 * | 9/2002 | Cloonan et al. ............... 370/468 |
| 2003/0043846 A1 * | 3/2003 | Purpura et al. ................ 370/468 |
| 2003/0097443 A1 * | 5/2003 | Gillett et al. .................. 709/225 |
| 2004/0158644 A1 * | 8/2004 | Albuquerque et al. ....... 709/238 |
| 2005/0198130 A1 * | 9/2005 | Bosloy et al. ................. 709/204 |

* cited by examiner

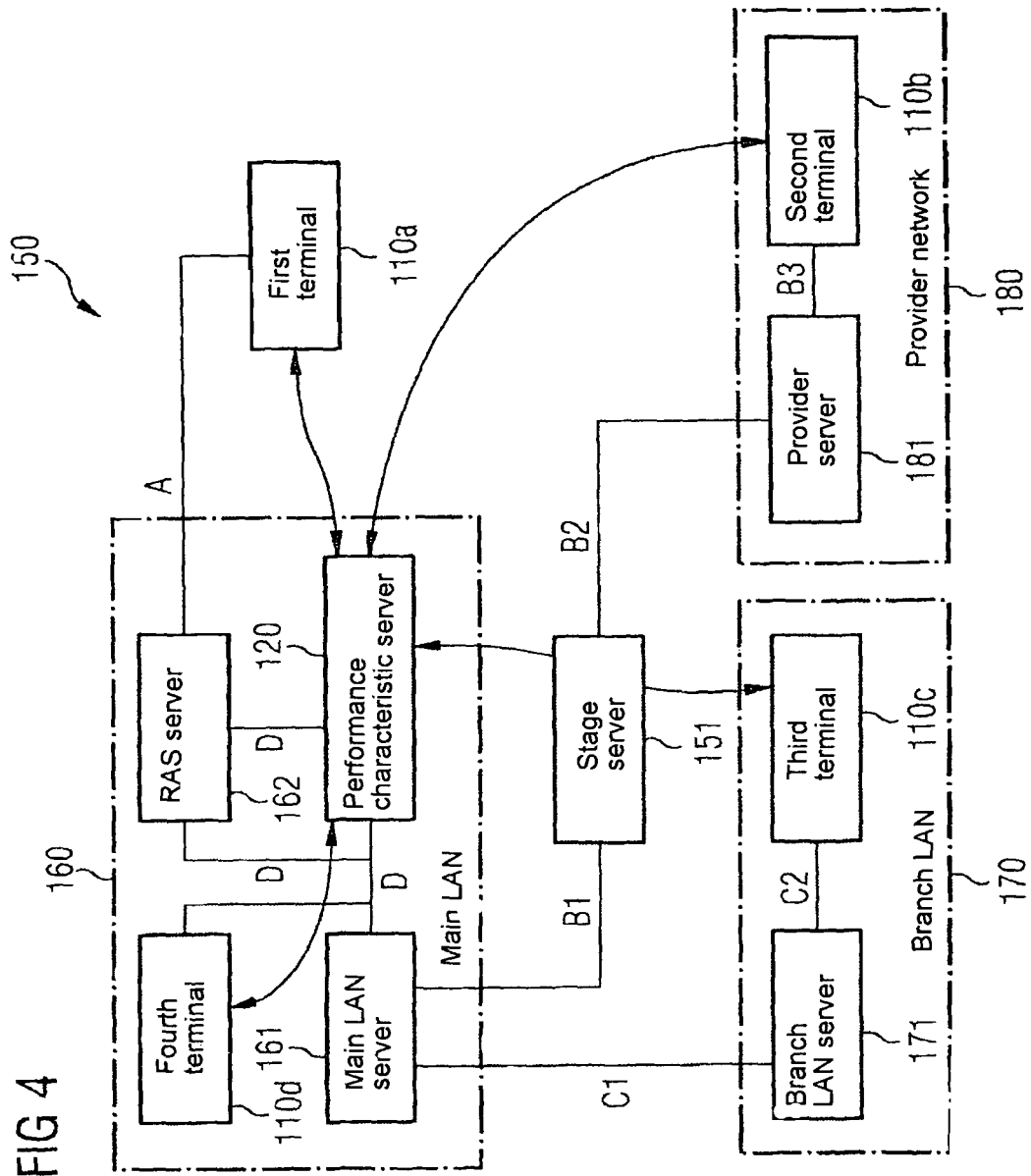

METHOD FOR PROVIDING PERFORMANCE CHARACTERISTICS ON DEMAND

CROSS REFERENCE TO RELATED APPLICATIONS

This application is the US National Stage of International Application No. PCT/EP2004/051729, filed Aug. 5, 2004 and claims the benefit thereof. The International Application claims the benefits of German application No. 10345184.6 DE filed Sep. 29, 2003, both of the applications are incorporated by reference herein in their entirety.

FIELD OF INVENTION

The invention relates to a method for the transmission of software and/or data on demand from a server to a terminal in a packet network.

BACKGROUND OF INVENTION

The principle application for terminals in a network is frequently reloading certain software components from the network only on demand. This principle is known as software-on-demand. This enables the terminal to operate with less memory capacity because the amount of software and data in the terminal, which would otherwise not be used, is reduced and also central management of data and software, including in many cases the saving of software license fees, is enabled.

This principle is particularly known for IP-based telecommunication networks in which terminals reload the software for certain performance characteristics only if the user requires the performance characteristic, i.e. if he uses or activates it (feature-on-demand). For this, the performance characteristics are stored on a central server, also known as a "feature mall" and a performance characteristic is transmitted to the terminal on activation and installed there. The feature mall can also serve as a centralized or decentralized service.

This process is satisfactory for the user only if he notices the transmission as little as possible, i.e. particularly if he does not have to take into account long waiting times. This depends mainly on whether the bandwidths necessary for quick transmission are available at the demand timepoint.

Within local networks (LAN) the bandwidths are normally sufficient to enable features to be transmitted almost in real time. The user in this case can thus hardly distinguish between whether the performance characteristic is being transmitted on demand or it is already installed in his terminal.

SUMMARY OF INVENTION

For other network configurations, such as for a teleworker or network with several local networks connected to each other only through the Internet, bottlenecks with fewer bandwidths are, in contrast, frequently present. In this case, the principle of the transmission of performance characteristics on demand can easily lead to unacceptable waiting times and thus to greater dissatisfaction on the part of the user. This naturally applies to a greater extent with complex and more comprehensive performance characteristics.

Bandwidths are managed in a packet network of a network resource manager. The network resource manager is of course used only to perform call acceptance control. Waiting times when reloading performance characteristics on demand are therefore not hindered.

An object of the invention is to provide a method and a device by means of which the transmission of software and data on demand under practical conditions is possible in a satisfactory manner.

The object is achieved with a method and a terminal in accordance with the claims.

The invention includes the essential concept of checking before transmission to determine whether the existing resources are sufficient, to thus quickly realize the availability of software or data. The core question in this case is whether a transmission on a loading inquiry can be quickly enough performed, which depends mainly on the bandwidth. Therefore if the existing available bandwidth is insufficient, the loading inquiry is rejected.

The method in accordance with the invention, and the server, ensure by means of the bandwidth test that at the timepoint of transmission sufficient bandwidth is available for transmission within a time limit (taking account of specifiable, user habits). By means of the bandwidth, a loading time that is satisfactory for the user can be guaranteed and unreasonable waiting times can be reliably prevented when transmitting software or data.

Furthermore, the terminal in accordance with the invention makes it transparent to the user which performance characteristic is actually available within an acceptable time and not just nominally available. Also where there is less available bandwidth, the user is not misled into selecting a performance characteristic several times that, although it is in his selection list, cannot be transmitted, or at least not transmitted at present.

The method is preferred for use in IP-based telecommunication networks. Terminals, particularly with small own resources that are frequently for telecommunication, profit from transmission on demand and at the same time the waiting times are acceptably low.

In the application that is the most important from the present point of view, the software to be transmitted is a performance characteristic that is demanded as required by the terminal. In this case, the method in accordance with the invention makes sure that the application of such externally-stored performance characteristics is not impeded by long loading times.

Advantageously, the required bandwidth is calculated using an upper limit for the loading time. To do so, the parameter that is of greatest interest to the user is used as a criterion for the loading time. This means that no more bandwidth, and thus no expensive network resources, are used than is necessary.

The amount of available bandwidth resources may also be calculated according to a specified upper limit of a transmission time for transmitting the software component to the requesting terminal. The amount of available bandwidth resources may also be available to the requesting terminal and may be included in the demand.

Preferably, the information on the required bandwidth is part of the demand and thus made available by the terminal. This enables a demand for the available bandwidth that is individual and also configurable relative to the terminal. As an alternative or addition, the information on the required bandwidth is part of the demand data or demand software and thus made available by the server. The server has access to the particular requested software or requested data with which a bandwidth demand can be stored at the same time, or from which the bandwidth demand can be easily determined.

In a further preferred embodiment, the information about the available bandwidth is made available by a network resource manager, with this information in particular being updated regularly or on request by the server. Up-to-date bandwidth data is thus always available, and a network resource management already existing for other tasks can be used.

Preferably, the network resource management manages priorities for all network resource requirements and performs the following steps in the event of a negative test result from the bandwidth test.

Determines the demand difference between the required and existing network resources for the transmission.

Seeks one or more processes with a lower priority than the demand, the total network resources of which correspond to, or exceed, the demand difference and if the search is successful, applies limitations of network resources to the searched processes until complete freezing, so that the total limitations correspond at least to the demand difference.

This procedure enables network resources from different users, terminals or demanded data or software to be assigned according to importance and enables a loading inquiry that would otherwise fail to be nevertheless served with the required bandwidth with appropriate importance.

In a further preferred embodiment, a message is sent to the terminal in the event of a negative test result of the bandwidth test, whereby the message can contain one of the following rejections.

A temporary rejection of the demand, whereby succeeding similar demands can be generated and successfully answered.

A permanent rejection of the demand whereby succeeding similar demands cannot be generated or are immediately answered with a further permanent rejection without further processing steps.

Therefore, if because of the small available bandwidth no transmission of the demanded data or software takes place, the terminal receives information as to whether further similar loading inquiries could be successful either immediately or at a subsequent timepoint. Advantageously, a new loading inquiry is automatically generated after a temporary rejection. If the demanded bandwidth was only temporarily not present, it can thus be served at a later timepoint.

On the other hand, the following loading inquiries which in any case cannot be served, can be suppressed from the start. A permanent rejection generated by one of the following steps is preferred:

Single or repeated temporary rejection

Comparison of the required bandwidth with the maximum available bandwidth.

In both cases, it is probable or certain that other loading inquiries will also not be met, and this information will be available to the terminal in the manner described.

Preferably, the message is displayed to the user of the terminal, particularly in that the option to demand that has led to the message is marked with a warning notice or made completely inaccessible.

With the server in accordance with the invention, a bandwidth demand memory for storing the required bandwidth for the performance characteristic is, additionally, advantageously connected to the performance characteristic providing device, so that for the performance of the bandwidth test the performance characteristic providing device can determine which bandwidth requires a transmission of data and/or software in accordance with a loading inquiry for a performance characteristic. This bandwidth demand memory enables the required bandwidth to be looked up quickly.

Preferably, the performance characteristic providing device has access to a maximum bandwidth memory for storage of the maximum available bandwidths for connection to terminals, in order, additionally or alternatively, to perform a bandwidth test using the maximum available bandwidths. The maximum bandwidths can thus be easily looked up.

In a preferred embodiment, a network resource allocation device is provided, that is connected to the performance characteristic providing device and has access to the available-bandwidth memory, with the network resource allocation device being able to assign or refuse network resources to the loading inquiry and update the available-bandwidth memory accordingly. A network resource allocation device of this kind is normally part of a server and can be easily used for bandwidth-relevant communication with the performance characteristic providing device.

Advantageously, the network resource allocation device is connected to a network resource test device, that has access to the available-bandwidth memory and at least one connection to a terminal, in order to determine and store current bandwidth data. By means of the connection to the terminal, the network resource test device can determine and store the current available bandwidths, so that current data is stored in the available-bandwidth memory.

In a further advantageous manner, the network resource allocation device has access to a network resource distribution memory that stores the data on bandwidths assigned to processes and the priorities of these processes, whereby the network resource allocation device can redistribute network resources relative to the priorities of the process and the loading inquiry, in order to make sufficient bandwidth available for the loading inquiry. A network resource distribution memory of this kind is a pre condition for intelligent management of existing network resources.

It is further preferred if the network resource allocation device has access to a network resource demand memory that stores data on the demanded bandwidths, in order to manage processes to which no bandwidths are presently assigned. A memory for processes that are still not processed or are frozen enables greater flexibility in the intelligent management of existing network resources.

In the terminal in accordance with the invention, a performance characteristic is, after temporary rejection by the server, highlighted when updating the display and not displayed after a permanent rejection. The user thus receives an easy to understand feedback on the performance characteristics that are presently unavailable and can at least not select such performance characteristics due to inadequate bandwidth in the existing network configuration and network usage.

The invention is explained in the following, including with regard to other performance characteristics and advantages, using examples of embodiments and with reference to the accompanying tables and drawings.

The tables are as follows:

Table 1 is an example of a network resource management table stored in a server in accordance with the invention and table 2 is an example of an availability table of performance characteristics stored in a server in accordance with the invention.

BRIEF DESCRIPTION OF THE DRAWINGS

The illustrations are as follows:

FIG. 3 is a detailed diagrammatic representation of the functional units in a server in accordance with the invention and FIG. 4 is a block diagram of a network arrangement in accordance with the invention.

DETAILED DESCRIPTION OF INVENTION

Figure 1:
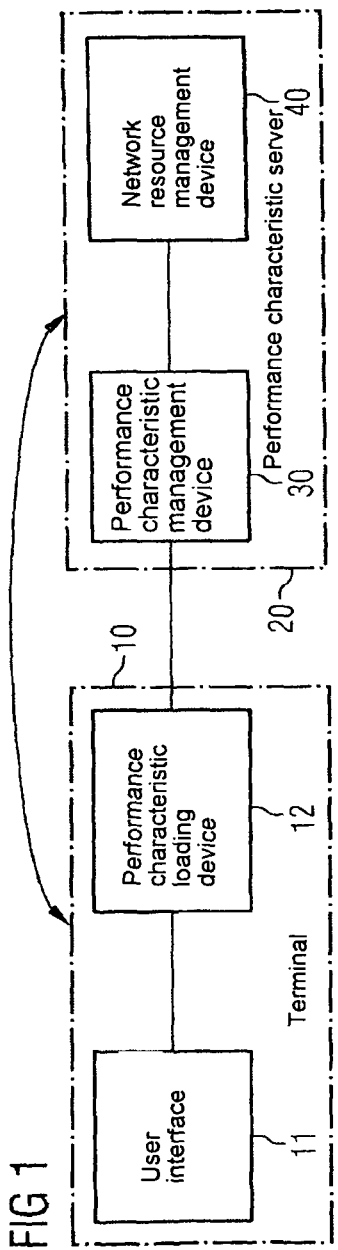
FIG. 1 is a very simplified diagrammatic representation of a minimum network with a terminal in accordance with the invention and a server in accordance with the invention.

FIG. 1 is a very simplified representation of a network with a terminal 10 in accordance with the invention and a server 20 in accordance with the invention. The network is a packet network and can be an IP-based telecommunication network, whereby terminal 10 can also be a telecommunication terminal.

The terminal 10 offers the user access to various software or data via a user interface 11, that the user can select and then, if they are not locally available, load them from the server 20 on demand.

Frequently, the software is a performance characteristic that is requested by a performance characteristic loading device 12, connected to the user interface, on demand from the server 20 or from a service running on this server. Therefore, only the term performance characteristic is used in the following, but this included all general software or data that in principle can be processed in a similar manner by the method and devices in accordance with the invention.

As a further preliminary remark it should be noted that in the following the bandwidth is used as the criterion for an adequate performance. For the user, the bandwidth converts directly to waiting time, i.e. it is the appropriate parameter even though adequate bandwidth plays no direct role with regard to the user. Therefore, if necessary, the requirement of a realtime application can be included, as realtime means none other than that the waiting times are very small and, depending on the requirements of the requested application, can be ignored, or are in the area that is also required for the activation of local functions.

A loading inquiry corresponding to the selected performance characteristic is sent by the performance characteristic loading device 12 to a performance characteristic management device 30, connected to it, in the server 20 and there it is processed. The performance characteristic management device 30 is connected to a network resource management device 40, the main task thereof being to provide information on network resources. A more precise functional description of these devices is given below in conjunction with FIGS. 3 and 4.

Figure 2:
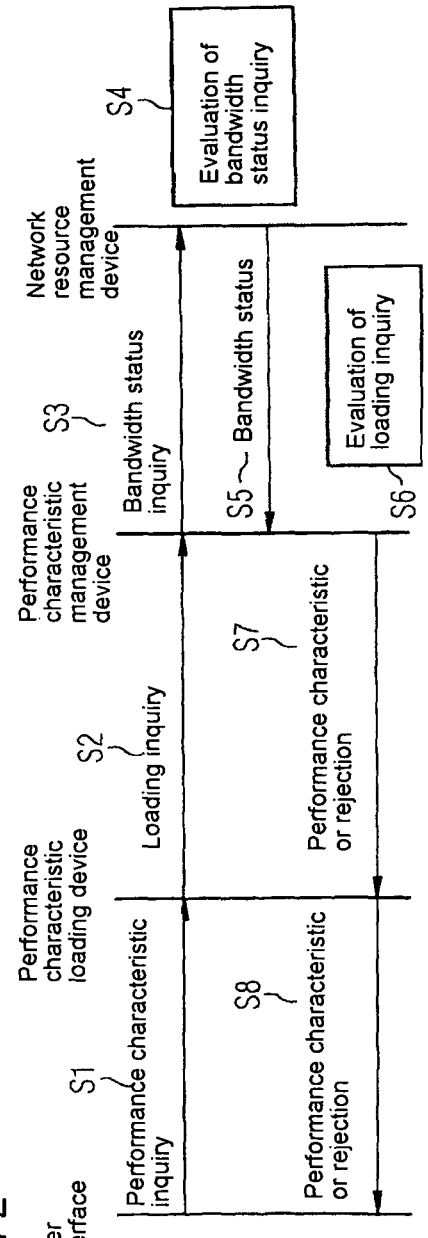
FIG. 2 is an example of data exchange between a terminal and a server using the method in accordance with the invention.

FIG. 2 shows an example of a data and message exchange between the terminal 10 and the server 20 using the method in accordance with the invention. In the user interface 11, a user selects a performance characteristic and the user interface 12 passes the corresponding demand to the performance characteristic loading device 12 (step S1). The performance characteristic loading device normally passes this loading inquiry on to the performance characteristic management device 30 in the server 20 (step S2). It is also possible to test beforehand to determine whether a similar load demand has already been made or whether, for example, a forwarding of the demand should not, or cannot, take place due to network problems.

After receiving the loading inquiry, the performance characteristic management device 20 sends a bandwidth status request to the network resource management device 40 (step S3). This bandwidth status request is processed by the network resource management device 40 in a manner described in more detail in conjunction with FIG. 4 (step S4) and the bandwidth status is passed back to the performance characteristic management device 30 (step S5).

The performance characteristic management device 30 evaluates the loading inquiry (step S6). Firstly, a test is carried out to determine whether the available bandwidth is sufficient for transmission of the demanded performance characteristic (this bandwidth test is also explained in more detail below in conjunction with FIG. 4). It should be noted that the bandwidth test can also be carried out without a network resource management device 40 and the associated process steps S3 to S5. The test is then limited to information that is independent of the dynamic properties of the network connections. The main examples of this could be no performance characteristics to be transmitted via a bottleneck, perhaps an Internet connection, or outside their own local area network (LAN), or to already set a limit (possible time-related) at the server end, i.e., in principle to transmit no performance characteristics that exceed a maximum limit of required bandwidth.

If the bandwidth test proves positive, the demanded performance characteristic is transmitted to the performance characteristic loading device 12 (step S7); if the result is negative, a message containing the rejection is sent. The performance characteristic loading device 12 can forward the performance characteristic, or the message, simply to the user interface (step S8) and thus end the process cycle. As an alternative or in addition, it can also carry out its own process steps. These includes caching, a temporary storage of the performance characteristic in order to be able to make it available to another connected user interface, or a local storage of the performance characteristic on a permanent storage medium for subsequent requests. Also in the event of a rejection the performance characteristic loading device 12 can automatically evaluate the rejection and generate a loading inquiry again if required, and send it to the server. For this, it is advantageous if the rejection is divided into at least two classes, i.e. temporary and permanent rejections. A temporary rejection could contain the information that although at present not enough bandwidth is available, in principle if there is a lower loading due to other processes a transmission with the required bandwidth would be possible. A permanent rejection on the other hand indicates that even further loading inquiries would not lead to a transmission of the required performance characteristic. In this case a temporary rejection that is made once or several times can lead to a permanent rejection. This decision can be made both at the server and terminal ends. A further possible reason for a permanent rejection is if the maximum bandwidth is less than that requested.

The user interface 11 installs the transmitted performance characteristic that is useable by the user from this timepoint. If the loading inquiry of the user has not led to transmission of the selected performance characteristic, the user interface indicates this to the user. This can be a simple message, but is clearer if the result of the present and earlier demand requirements can be seen directly when selecting possible performance characteristics. Each performance characteristic can, e.g. be provided with a (color) coding or an addition on a control panel of the relevant terminal, that indicates its status, i.e. local performance characteristic, already reloaded, loading attempt failed (once or x-times). In particular, a performance characteristic can also no longer be shown after an associated loading attempt has failed.

Furthermore, the reason why his demand has led to refusal can be indicated to the user. For example, he has demanded a performance characteristic that requires a bandwidth of 200 kbit/s, and the rejection includes the information that at present only 100 kbit/s are available. This enables the user to see on one hand the size of the network resource deficiency and on the other hand the user interface can offer him an option to resend the demand requirement that then includes information on the reduced required bandwidth.

Figure 3:
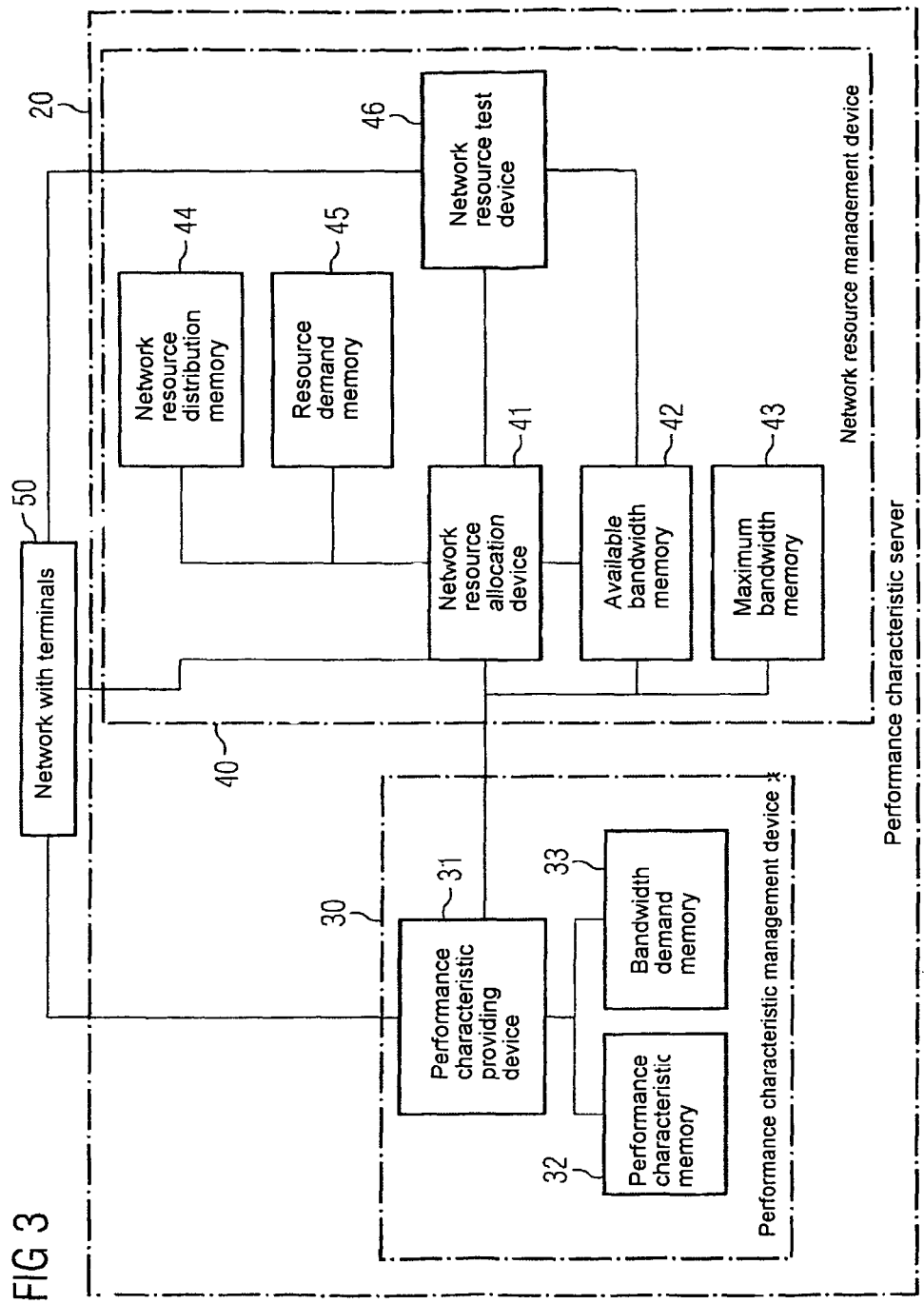

FIG. 3 shows a detailed diagrammatic representation of the functional units in a server in accordance with the invention. Several functional units in the server 20 are connected to a network 50 with terminals 10. In the very simplified abstract level of FIG. 1, the server shows the performance characteristic management device 30 and network resource management device 40 as the main components.

The performance characteristic management device 30 has a performance characteristic providing device that is connected externally to the performance characteristic loading device 12 of a terminal 10 in the network 50. Furthermore, it has a performance characteristic memory 32 that stores the software or data for performance characteristics, and a bandwidth demand memory 33 that stores the bandwidths, matching the performance characteristic, required for a transmission. The performance characteristic providing device has access to these two memories 32 and 33 of the performance characteristic management device.

The central element of the network resource management device is a network resource allocation device 41 that is connected to the terminals 10 of the network 50 and to the performance characteristic providing device 31, from which it can receive network resource requests and bandwidth status requests. The network resource allocation device 41 allocates bandwidths to processes and loading inquiries or refuses them.

The network resource allocation device 41 has access to an available-bandwidth memory 42 that holds a list of available bandwidths for connection to the terminals 10, and to a maximum-bandwidth memory 43 that holds a corresponding list of maximum available bandwidths for connection to terminals 10. The performance characteristic providing device also has direct access to both bandwidth memories 42 and 43. Furthermore, the network resource allocation device 41 has access to a network resource distribution memory 44 in which data on the allocation of network resources to associated processes is stored, and a network resource demand memory 45 in which data on demands for network resources or such processes is stored, to which despite demand no network resources is allocated.

A network resource test device 46 is connected to the terminals 10 of the network 50, to test which bandwidths are presently available for connection to a terminal 10. The network resource test device 46 has access to the available-bandwidth memory 42, in order to update the data stored there, and also a connection to the network resource allocation device 41, in order to receive demands for such an updating.

FIG. 4 is a block diagram of a network 150 in accordance with the invention. The first to fourth devices in accordance with the invention, 110a, 110b, 100c and 110d, are connected by various types of connections to the performance characteristic server 120 in accordance with the invention. In this case, the performance characteristic server 120 is part of a main LAN 160 in which typical tasks such as those of a proxy server, a name server, an Internet server, a firewall etc., are combined in a main LAN server 161. The performance characteristic server 160, the main LAN server 161 and an RAS server (Remote Access Service Server) 162 are connected to each other through the main LAN 160 by connections D. All the described services of the main LAN 160 can of course be physically distributed to any number of computers, or in an extreme case can all run on the same computer.

In a branch LAN 170, a branch LAN server 171 is connected to the main LAN server 161 through a connection C1, that is not part of either of the two LANs, otherwise the main and branch LANs 160 and 170 would also be only one LAN. In this case the branch LAN server 171 in the branch LAN 170 has tasks similar to the main LAN server 161 in the main LAN 160.

In a provider network 180, a provider server 181 is connected directly via stage server 151 through the connection paths B1 and B2 to the main LAN server 161.

The connections illustrated are actually only examples. In a realistic network each connection would have far more directions and include any number of further stage servers and routers.

Terminals 110a-110d illustrate various scenarios showing the ways in which performance characteristics can be demanded and transmitted.

The first terminal 110a is connected via a connection A, which for example can be an ISDN line, to the RAS server 162. At this terminal, for example, a teleworker can work via a conventional telephone connection. The second terminal 110b is connected via a connection B3 to the provider server 181. This could be a teleworker to a VPN client (virtual private network client) via a DSL line or also be the user of a mobile telephone. The third terminal 110c is connected via a connection C2 to the branch LAN server 171. The branch LAN 170 can be the LAN of a branch, another subsidiary or an international office or similar. Finally, the fourth terminal 110d is integrated directly into the main LAN 160 via a connection D. Further types of connection, including wireless, (e.g. LAN or Blue Tooth) are possible with the usual network connections.

The evaluation of the bandwidth status request (step S4) and the evaluation of the loading inquiry (S6) are described in more detail in the following. The steps of the process not repeated here are also to be transferred without further explanation to the more complex network example 150.

In step S4, the network resource allocation device 41 receives a bandwidth status request. This contains the information regarding which bandwidth is requested and for which terminal. The associated route can, for example, be identified by IP addresses, a terminal identification number, domain name or LINs (Location Identification Numbers).

The performance characteristic providing device 31 looks up the bandwidth information in the bandwidth demand memory using the requested performance characteristic. In Table 1, the two thick-framed left columns indicate a corresponding list with an identification number for the performance characteristic and the associated required bandwidth. As an alternative, the required bandwidth can also be part of the loading inquiry.

It should be understood that the amount of available bandwidth resources may also be calculated according to a specified upper limit of a transmission time for transmitting the software component to the requesting terminal. The amount of available bandwidth resources may also be available to the requesting terminal and may be included in the demand.

In a simplest case, the network resource allocation device 41 then uses the data of the available-bandwidth memory 42 to check whether the bandwidth is available. In Table 1, an example of a table of such data is shown in the two thick-framed headers, in which the bandwidth available for each terminal is shown.

If sufficient bandwidth is available, i.e. the required bandwidth is less or equal to the available, the required bandwidth is allocated to the loading inquiry and withdrawn from the available bandwidth of the corresponding connection to update the available-bandwidth memory 42. The corresponding allocation of network resources is then the response to the performance characteristic providing device (step S5).

If not enough bandwidth is available, then in the simplest case only a rejection of the network resource allocation, that can contain a message regarding the available bandwidth, is sent as a response to the bandwidth status request.

However, it is also conceivable that the network resource allocation device 41 uses an optimization procedure to still be able to provide the demanded bandwidth. In this case it is conceivable that priorities are allocated to specified and demanded network resources and, if it is a process of lower priority than the loading inquiry, its network resources are reduced or completely withdrawn. This is of course only useful if the sum of the bandwidths made accessible in this manner together with the bandwidths that are free in any case is also sufficient for the loading inquiry, and it presumes a continuous priority system that can prioritize not only according to the importance of tasks but also of users or terminals.

From the data on the available bandwidth, the performance characteristic providing device 31 can assemble a table, as is shown in the example in the 4×6 right and lower columns/lines of Table 1. It is simpler if the performance characteristic providing device 31 can also directly access the available-bandwidth memory 42. Entered in this for each performance characteristic and each possible connection to a terminal is whether the performance characteristic is available or temporarily or permanently not available. Steps S3-S6 then come together as a single lookup in this table. It should be added that the performance characteristic providing device 31 can also reject the transmission of the performance characteristic at this point if the bandwidth would be sufficient, for example for security reasons.

To keep the available bandwidths in memory 42 up to date, the memory 42 must be updated periodically or on request from the performance characteristic providing device 31 or the resource allocation device 41.

For this purpose, the network resource test device 46 sends a bandwidth request to each terminal 110a-110d. On the way to the terminal, the bandwidth of the associated part connection is registered after each hop, and the assembled data is sent back via part connections to the network resource test device 46.

The result of this test procedure is shown in Table 2. For example, terminal 110b is connected via the provider server 181, the stage server 151 and the main LAN 160 to the performance characteristic server 120. The bandwidths available according to the test are entered for the corresponding part connections D, B1, B2 and B3. The bandwidths within a LAN are considered in each case to be adequate and correspondingly set to infinite. The column for the maximum bandwidth is taken from the maximum-bandwidth memory 43, but can also be initialized in a completely similar manner to the available bandwidths. The same applies to the type of connection.

The available bandwidth for the connection to a terminal can be determined from Table 2 using the principle of a bottleneck. For the connection to the terminal 110b, this bottleneck is the DSL connection B3 between the terminal 110b and the provider server 181, and the available bandwidth to the terminal 110b thus amounts to 256 kbit/s in accordance with Table 2.

Tables 1 and 2 are a clear and ready example of how the bandwidth test can be carried out. The particular data can also of course be determined in individual cases and such tables can be omitted.

As a development of the invention, in addition, a service can be used to search the server 20 (Feature Location Service) using the selected performance characteristic. This can be established either particularly by a server 20 or a Feature Mall Service that provides the performance characteristic, or one that is connected to the highest possible bandwidth.

The Feature Mall Service can also run decentralized on a terminal endpoint, as an option.

Furthermore, the performance characteristic management device 30 can be physically and logically separated from the network resource management device 40 or form a unit with it. Equally, the performance characteristic management device 30 can be decentralized or centralized. It is also conceivable that these services be distributed, i.e. that another server is responsible, depending on the performance characteristic. In this case, the Feature Mall Service is distributed and/or decentralized. It is clear to the expert that the server 20 can only be representative for the localization of the required services.

Finally it is pointed out that the invention does not depend on the type of packet network and can be used especially for H.323, SIP (Session Initiation Protocol) or proprietary standards.

Although the invention is described using examples of embodiments, it also includes other conceivable combinations of the described performance characteristics, as they are particularly, but not definitively, given in the dependent claims.

TABLE 1

| Performance characteristic Number | Required bandwidth | First terminal 64 kbit/s | Second terminal 256 kbit/s | Third terminal 512 kbit/s | Fourth terminal Ignored (infinite) | Destination terminal Available bandwidth |
|---|---|---|---|---|---|---|
| 1 | 25 kbit/s | available | available | available | available | |
| 2 | 275 kbit/s | permanently not available | temporarily not available | available | available | |
| 3 | 300 kbit/s | permanently not available | temporarily not available | available | available | |
| 4 | 150 kbit/s | temporarily not available | available | available | available | |
| 5 | 750 kbit/s | permanently not available | permanently not available | temporarily not available | available | |
| 6 | 80 kbit/s | temporarily not available | blocked | available | available | |

TABLE 2

| Identification number of terminal | Part sections between the terminal and performance characteristic server | Type of connection | Maximum bandwidth | Available bandwidth |
|---|---|---|---|---|
| 1 | D | LAN | 1 Gbit/s | Ignored |
|   | A | RAS ISDN | 128 kbit/s | 64 kbit/s |
| 2 | D | LAN | 1 Gbit/s | Ignored |
|   | B1 | WAN | 2 Mbit/s | 1 Mbit/s |
|   | B2 | Internet | X Mbit/s | 2 Mbit/s |
|   | B3 | DSL | 768 kbit/s | 256 kbit/s |
| 3 | D | LAN | 1 Gbit/s | Ignored |
|   | C1 | WAN | 2 Mbit/s | 512 kbit/s |
|   | C2 | LAN | 1 Gbit/s | Ignored |
| 4 | D | LAN | 1 Gbit/s | Ignored |

The invention claimed is:

1. A method for substantially real time transmission of a software component after receiving a demand for the software component from a requesting terminal of a network comprised of a server and a plurality of terminals, the requesting terminal being a terminal of the plurality of terminals, the method comprising:
triggering a bandwidth test, the bandwidth test comprising sending a bandwidth request to each terminal, registering a bandwidth of an associated part connection after each hop and receiving assembled data relating to bandwidth available for each terminal;
prior to initiating transmission of the software component, determining via the bandwidth test if a present bandwidth is sufficient for transmission of the demanded software component to the requesting terminal by identifying at least one lower priority process currently using bandwidth of the existing network that each has a lower priority than the demand and computing an amount of available bandwidth resources that is obtainable from reducing bandwidth resources assigned to the at least one lower priority process,
if the computed amount of available bandwidth resources is equal to or greater than an amount of bandwidth necessary to transmit the software component to the requesting terminal, reducing or freezing the at least one lower priority processes and transmitting the software component to the requesting terminal; and
if the computed amount of available bandwidth resources is less than the amount of bandwidth necessary to transmit the software component to the requesting terminal, inhibiting or rejecting transmission of the software component.

2. The method according to claim 1 wherein the amount of available bandwidth resources is also calculated according to a specified upper limit of a transmission time for transmitting the software component to the requesting terminal.

3. The method according to claim 2, wherein the amount of available bandwidth resources is available to the requesting terminal and is included in the demand.

4. The method according to claim 3 wherein the server has access to the software component and the amount of available bandwidth resources.

5. The method according to claim 4 wherein the bandwidth test provides a positive test result if the amount of available bandwidth resources is suitable for a real time application, or wherein the bandwidth test provides a positive test result if the amount of available bandwidth resources is suitable for a substantially real time application.

6. The method according to claim 4 wherein information regarding the present bandwidth is made available by a network resource manager and is updated on request by the server or after a period of time.

7. The method according to claim 6 wherein if the amount of available bandwidth resources is less than the amount of bandwidth necessary to transmit the software component, a message is sent to the requesting terminal, the message comprising a temporary rejection or a permanent rejection of the load request.

8. The method according to claim 7 further comprising displaying the message to a user of the requesting terminal.

9. The method according to claim 7 further comprising generating a load request in response to the temporary rejection of the load request.

10. The method according to claim 7 wherein the permanent rejection is generated after a plurality of temporary rejections have been generated for a load request for the software component or after determining that the amount of bandwidth necessary to transmit the software component is greater than a maximum available bandwidth.

11. The method of claim 1 wherein the amount of bandwidth necessary to transmit the software component is at least partially defined by a transmission rate requirement provided in the demand.

12. The method of claim 11 wherein the amount of available bandwidth resources is calculated by a network resource manager that is connected to the server.

13. The method of claim 12 wherein the network resource manager is connected to an available bandwidth memory that has data on bandwidths assigned to processes using network bandwidth resources and priorities for these processes.

14. The method of claim 13 wherein the network resource manager is also connected to at least one of the terminals and wherein the available bandwidth memory is periodically updated with new data for the bandwidths assigned to processes using network bandwidth resources and priorities for these processes.

15. A computer configured for connection to a plurality of terminals of a network and configured to transmit a software component to a requesting terminal of the plurality of terminals after receiving a demand for the software component from the requesting terminal if bandwidth necessary for transmitting the software component to the requesting terminal is determined to be available, the computer comprising:
a network resource allocation device, the network resource allocation device configured to assign resources of the network to the terminals and reassign resources of the network from one terminal to another terminal;
a performance characteristic providing device connected to the network resource allocation device;
a network resource distribution memory connected to the network resource allocation device and the performance characteristic providing device, the network resource distribution memory having stored data on bandwidths assigned to processes using bandwidth resources of the network and priorities for these processes;
a network resource test device connected to at least one of the network resource allocation device, the performance characteristic providing device, and the network resource distribution memory, the network resource test device configured to oversee a bandwidth test, the bandwidth test comprising sending a bandwidth request to each terminal, registering a bandwidth of an associated part connection after each hop in a communication path between each terminal and the computer, and receiving assembled data relating to bandwidth available for each terminal via any associated part connections in each communication path;

the performance characteristic providing device configured to determine whether an amount of bandwidth exists that is sufficient for transmission of the demanded software component by accessing the data stored on the network resource distribution memory to identify at least one lower priority process using bandwidth of the network that each has a lower priority than the demand in the network and calculate an amount of available bandwidth resources that is obtainable from reducing bandwidth resources of the network assigned to the at least one lower priority process; and the network resource allocation device configured to reduce or freeze the network resources assigned to the at least one lower priority process and transmit the software component to the requesting terminal if the computed amount of available bandwidth resources is equal to or greater than an amount of bandwidth necessary to transmit the software component to the requesting terminal; and the network resource allocation device configured to inhibit or reject transmission of the software component if the computed amount of available bandwidth resources is less than the amount of bandwidth necessary to transmit the software component to the requesting terminal.

16. The computer of claim 15 wherein the computer is a server or is comprised of a server.

17. The computer of claim 15 wherein bandwidth demand data is also stored in the network resource distribution memory.

18. The computer of claim 15 wherein the performance characteristic providing device is a portion of the network resource allocation device.

19. The computer of claim 15 wherein the network resource allocation device is also configured to periodically update the data stored in the network resource distribution memory.

* * * * *